Patented July 22, 1941

2,249,973

UNITED STATES PATENT OFFICE 2,249,973

PRODUCTION OF STABLE LEUCO COMPOUNDS OF ANTHRAQUINONE VAT DYESTUFFS

Joachim Mueller and Wilhelm Muenster, Ludwigshafen-on-the-Rhine, Germany, assignors to General Aniline & Film Corporation, a corporation of Delaware No Drawing. Application July 21, 1939, Serial No. 285,676. In Germany July 23, 1938

7 Claims. (Cl. 260—691)

The present invention relates to a process of producing stable leuco compounds of anthraquinone dyestuffs.

We have found that stable leuco compounds of anthraquinone vat dyestuffs which are soluble in water and alkali, respectively, are obtained by allowing organic acid dihalides or organic inner sulphonic acid-carboxylic acid anhydrides to act on vatted anthraquinone vat dyestuffs.

Generally speaking, the reaction takes place in such a way that when starting with dihalides one of the halogen atoms of the organic acid dihalides and when starting with the inner acid anhydrides the carboxyl group reacts with the vatted anthraquinone vat dyestuffs while in the case of the dihalides the second halogen atom is replaced by a hydroxyl group and in the case of the inner anhydrides a sulphonic acid group is formed which groups in either case render the final products soluble in water and/or in alkali. The reactions may be represented by way of example by the following equations, wherein D stands for the radical of an anthraquinone dyestuff:

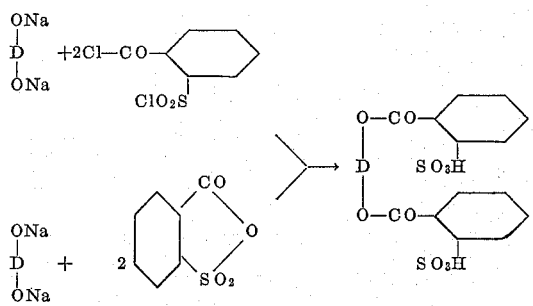

Examples of acid halides of the said kind are halides of aromatic sulpho-carboxylic acids, as for example ortho-sulphobenzoyl chloride

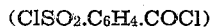

(ClSO$_2$.C$_6$H$_4$.COCl)

or corresponding halides derived from phosphoric acid, as for example monometacresyl phosphoric acid chloride (C$_7$H$_7$—O—POCl$_2$) or monobetanaphthyl phosphoric acid chloride

(C$_{10}$H$_7$O.POCl$_2$)

Acid halides of polycarboxylic acids may also be used, as for example the dichloride of 4-carboxyphenylacetic acid. The water- or alkali-solubilising groups are directly formed in the case of the said compounds. Suitable inner sulphonic acid carboxylic acid anhydrides are for example ortho-sulphobenzoic acid anhydrides.

The expression "anthraquinone vat dyestuffs" is intended to have the meaning given in the work of Kunz in "Bulletin de la Société Industrielle de Mulhouse," 1934. For example there may be mentioned as such dyestuffs the vat dyestuffs of the dibenzanthrone, dibenzpyrenequinone, anthraquinoneacridone and anthranthrone series. There may also be used for the process vat dyestuffs derived from the proper anthraquinones, as for example 1-benzoylamino-4-chloranthraquinone.

The procedure for the preparation of the leuco compounds may be for example that the dyestuff is vatted in the usual way with the necessary amount of caustic alkali and sodium hydrosulphite, the acid halide or the acid anhydride being added to the resulting vat. Depending on the reactivity of the acid halides and acid anhydrides, they are added in more or less large batches, if necessary while cooling.

When the reaction does not proceed very rapidly, it is preferable to exclude air. This measure is especially advisable when the reaction mixture is shaken. Generally speaking it is advantageous or even advisable to add either an excess of caustic alkali or of agent capable of binding acids, such as alkali carbonates or pyridine. Especially good results are obtained when the reactions are carried out in the presence of a dispersing agent of the kind of condensation products of naphthalene sulphonic acids and formaldehyde or of quaternary ammonium, sulphonium and phosphonium compounds containing in their molecule at least one higher molecular aliphatic radical. The leuco compounds formed are separated for example by salting out. They may be converted into paste or powder form according to the purpose for which they are to be used.

The leuco compounds are stable in the air. They may be saponified in acid and sometimes also in alkaline liquids and in the presence of oxidising agents are converted into the vat dyestuffs from which they are derived. They may therefore be used for dyeing and printing fibrous materials of a great variety of kinds. It should be remarked in particular that in contrast to the hitherto known sulphuric acid esters of vat dyestuffs, the leuco compounds obtained according to this process may frequently also be oxidised to the dyestuffs in alkaline liquids and therefore open up new kinds of tinctorial uses.

The following examples will further illustrate how this invention may be carried out in practice, but the invention is not restricted to these examples. The parts are by weight, if not other-

Example 1

40 parts of mono-metacresyl-phosphoric acid chloride are added to a vat prepared at 45° C. from 12 parts of dimethoxydibenzanthrone, 650 parts of water, 20 parts of 38 per cent sodium hydroxide solution and 10 parts of hydrosulphite, and the mixture is shaken while excluding air until a sample no longer oxidises in the air. The red compound thus formed is filtered off by suction. Further amounts thereof may be recovered from the deep red coloured mother liquor by salting out. The leuco compound is stable. It dissolves in water giving a red coloration and goes onto cotton or other fibrous materials from this solution. By development with sulphuric acid and sodium nitrite, the known brilliant green dyeing of the dimethoxy-dibenzanthrone is obtained.

A similar final product is obtained by using mono-beta-naphthyl-phosphoric acid chloride instead of mono-meta-cresyl-phosphoric acid chloride.

The leuco ester obtained in the same way by using dibenzpyrenequinone goes onto cotton from aqueous solution and yields by development with sulphuric acid and sodium nitrite the golden yellow initial dyestuff.

Example 2

2 parts of Bz2,Bz2'-dimethoxydibenzanthrone are vatted in 150 parts of water with 6.5 parts of 35 per cent sodium hydroxide solution and 1.5 parts of sodium hydrosulphite at 60° C. The vat is cooled to room temperature and shaken with 3 parts of ortho-sulphobenzoic acid dichloride until the red solution formed no longer oxidises in the air. A small addition of pyridine is of advantage during the reaction. The potassium salt of the ester formed may be precipitated from the resulting solution with potassium chloride. It dissolves in water and goes onto goods to be dyed with a red colour. It may be developed either with sodium nitrite in the presence of sulphuric acid or also by treatment with an about 5 per cent sodium hydroxide solution with an addition of 1 part of 30 per cent hydrogen peroxide per litre at from 80° to 90° C.

The leuco ester is suitable also for the preparation of prints, which yield powerful shades of colour by development with sulphuric acid and sodium nitrite. The dyestuff may also be developed by adding to the printing paste, in addition to the usual thickening agents, sodium hydroxide solution and advantageously a small amount of ammonium vanadate, the prints being steamed and worked up as usual after printing.

Similar leuco compounds are obtained from anthraquinone-1(N)-2-naphthacridone, dibenzpyrenequinone, dibromdibenzpyrenequinone, 1-benzoylamino - 4 - chloranthraquinone, pyranthrone, dibenzanthrone and dibromanthanthrone.

Example 3

2.5 parts of the dichloride of 4-carboxyphenyl-acetic acid are added at 10° C. to a vat prepared at 45° C. from 1 part of anthraquinone-1(N)-2-naphthacridone, 2.5 parts of 35 per cent sodium hydroxide solution, 1 part of sodium hydrosulphite and 250 parts of water, and the liquid is heated to about 30° C. while stirring. Its shade of colour thus changes from Bordeaux to yellow-brown. The solution, which is kept alkaline by the addition of sodium carbonate, is stirred for 2 hours further and the corresponding alkali salt of the leuco compound formed is then precipitated by the addition of potassium or sodium chloride. This is yellow-brown, dissolves in water and goes onto the fibre with a yellow-brown colour. The dyeing may be developed either in acid solution with sodium nitrite or in alkaline solution with hydrogen peroxide or similar oxidising agents to give the red shade of colour of the vat dyestuff.

Example 4

A vat is prepared from 1 part of flavanthrone, 250 parts of water, 2.5 parts of 35 per cent sodium hydroxide solution and 1 part of sodium hydrosulphite while excluding air in a stirring vessel. It is cooled to 0° C., 5 parts of the dichloride of ortho-sulphobenzoic acid are added and the whole stirred for about ¼ hour. Some sodium hydroxide solution is then added, the liquid is heated to from 40° to 50° C. and the alkali salt precipitated in the above manner. It is filtered off by suction and dried. The leuco compound dissolves in water with difficulty but goes into solution with a blue coloration upon the addition of alkali and goes onto cotton from this solution. By development with sulphuric acid and alkali nitrite or sodium hydroxide solution and an oxidising agent, such as hydrogen peroxide, the dyeing of the vat dyestuff is obtained.

Example 5

2 parts of dimethoxydibenzanthrone are vatted in 150 parts of water with 6.5 parts of 35 per cent sodium hydroxide solution and 1.5 parts of sodium hydrosulphite at 60° C. The vat is then cooled to room temperature and shaken with 3 parts of ortho-sulphobenzoic acid anhydride until the red solution formed no longer oxidises in the air. A small addition of pyridine is of advantage during the reaction. From the resulting solution, the potassium salt of the ester formed may be precipitated with potassium chloride. The ester thus obtained is identical with that obtained according to Example 2.

Example 6

4 parts of a 23 per cent paste of dibromo-Bz2,Bz2'-dimethoxydibenzanthrone are vatted at 60° C. in 75 parts of water with an addition of 2 parts of the sodium salt of the condensation product of beta-naphthalene sulphonic acid with formaldehyde, 1 part of 35 per cent sodium hydroxide solution and 0.75 part of sodium hydrosulphite. The vat solution is cooled to about 5° C. and there are added in small batches while excluding air 2 parts of ortho-sulphobenzoic acid anhydride, the reaction mixture being stirred until the red solution formed is no longer oxidised in the air. It is preferable to keep the reaction mixture always alkaline by the addition of sodium carbonate solution. The leuco ester formed is then separated in the usual manner by the addition of common salt. It dissolves in water giving a brown-red coloration and may be again split up into the green initial dyestuff with acid or sodium hydroxide in the presence of an oxidising agent.

Example 7

2.3 parts of dibrom-Bz2,Bz2'-dimethoxydibenzanthrone are vatted at 60° C. in 150 parts of water with an addition of 2 parts by volume of 35 per cent sodium hydroxide solution and 1 part of sodium hydrosulphite. The resulting vat solution is cooled to room temperature. This solution is then allowed to flow into a mixture of 1280 parts of water and 220 parts of a 13.5 per cent solution of the quaternary ammonium compound prepared from 1 molecular proportion of oleylamine and 6 molecular proportions of ethylene oxide and 1 molecular proportion of dimethyl sulphate; while stirring 15 parts of meta-sulphobenzoyl chloride are rapidly added. The blue coloured vat solution immediately changes to red and the solution has a weak acid reaction. The solution is neutralised, preferably with sodium bicarbonate, whereby the colour of the solution changes to yellowish red. The leuco ester is separated from the solution in the usual manner by salting out.

*Example 8*

A mixture of 1.61 parts of Bz2,Bz2'-diethoxy-dibenzanthrone and 0.7 part of the condensation product of beta-naphthalene sulphonic acid and formaldehyde is finely dispersed in 100 parts of water. After adding 2 parts by volume of 35 per cent sodium hydroxide solution and 1 part of sodium hydrosulphite, the whole is vatted for 10 minutes at 60° C. The vat solution is then cooled to 10° C. and there are added thereto 40 parts by volume of a 10 per cent solution of palm kernal fat-trimethyl ammonium bromide and then 6 parts of meta-sulphobenzoic acid dichloride, whereby the blue colour of the vat solution changes immediately to yellowish red. From the resulting solution cotton may be dyed in the usual manner and the dyestuff developed on the fibre with the aid of oxidising agents in an acid or alkaline medium.

What we claim is:

1. A process of producing stable leuco compounds of anthraquinone vat dyestuffs which comprises treating leuco compounds of anthraquinone vat dyestuffs in the aqueous vat with an acylating agent selected from the class consisting of organic aromatic acid dihalides and organic aromatic inner sulphonic acid-carboxylic acid anhydrides.

2. A process of producing stable leuco compounds of anthraquinone vat dyestuffs which comprises treating leuco compounds of anthraquinone vat dyestuffs in the aqueous vat with an acylating agent selected from the class consisting of organic aromatic acid dihalides and organic aromatic inner sulphonic acid-carboxylic acid anhydrides in the presence of an acid binding agent.

3. A process of producing stable leuco compounds of anthraquinone vat dyestuffs which comprises treating leuco compounds of anthraquinone vat dyestuffs in the aqueous vat with an acylating agent selected from the class consisting of organic aromatic acid dihalides and organic aromatic inner sulphonic acid-carboxylic acid anhydrides in the presence of a dispersing agent selected from the class consisting of quaternary ammonium, sulphonium and phosphonium compounds containing at least one higher molecular aliphatic radical.

4. A process of producing stable leuco compounds of anthraquinone vat dyestuffs which comprises treating leuco compounds of anthraquinone vat dyestuffs in the aqueous vat with an acylating agent selected from the class consisting of organic aromatic acid dihalides and organic aromatic inner sulphonic acid-carboxylic acid anhydrides in the presence of a condensation product of beta-naphthalene sulphonic acid and formaldehyde.

5. A process of producing stable leuco compounds of anthraquinone vat dyestuffs which comprises treating leuco compounds of anthraquinone vat dyestuffs in the aqueous vat with the dichloride of a sulphobenzoic acid.

6. A process of producing stable leuco compounds of anthraquinone vat dyestuffs which comprises treating leuco compounds of anthraquinone vat dyestuffs in the aqueous vat with orthosulphobenzoic acid dichloride.

7. A process of producing stable leuco compounds of anthraquinone vat dyestuffs which comprises treating leuco compounds of anthraquinone vat dyestuffs in the aqueous vat with ortho-sulphobenzoic acid anhydride.

JOACHIM MUELLER.
WILHELM MUENSTER.